Sept. 15, 1970            H. H. PASE            3,528,570

APPARATUS FOR UNLOADING BULK MATERIAL

Filed July 18, 1968            6 Sheets-Sheet 1

INVENTOR.
HUGH H. PASE

BY *Steward & Steward*
his ATTORNEYS

Sept. 15, 1970          H. H. PASE          3,528,570

APPARATUS FOR UNLOADING BULK MATERIAL

Filed July 18, 1968          6 Sheets-Sheet 5

FIG-7

INVENTOR:
HUGH H. PASE

BY Stewart & Stewart
his ATTORNEYS

United States Patent Office 3,528,570
Patented Sept. 15, 1970

1

3,528,570
APPARATUS FOR UNLOADING BULK MATERIAL
Hugh H. Pase, Cheshire, Conn., assignor to Pase Progressive Industries, Inc., Meriden, Conn., a corporation of Connecticut
Filed July 18, 1968, Ser. No. 745,770
Int. Cl. B65g 67/24
U.S. Cl. 214—44
12 Claims

ABSTRACT OF THE DISCLOSURE

A device for mechanically connecting hopper car unloading boots to the discharge outlets on the car for unloading bulk material from the car, in which a coupling member is lifted by means of a power cylinder from a lowered position between the rails of the track into engagement with the outlet and having means for shifting it transversely of the track into alignment with the outlet after it is lifted above the track.

---

This invention relates to apparatus for unloading bulk-material carrying cars such as railroad hopper cars and the like, and it relates more particularly to means for mechanically connecting the unloading apparatus to the discharge outlet in the bottom of such cars.

Large industrial concerns, including food processors, chemical companies and concrete mixing or hauling companies, receive flowable solid materials in bulk by the carload and have conveyor systems for moving the material from the car to storage silos or bins. In order to confine the material as it flows from the discharge outlet of the bulk car to the conveyor in the roadbed, a flexible coupling tube or shute, called a boot, is connected at one end to flanges around the outlet of the car. The lower end of the boot opens into a conveyor receptacle and is usually permanently attached thereto, making it necessary for the boot to be stored between the tracks while not in use. When the car is moved into position above the boot at the unloading station, the upper end of the boot is attached to the discharge outlet of the car, and the car unloaded.

Heretofore, the boot has been connected to the car by hand. Not only is this time-consuming and frequently difficult to do because of lack of space below the car, but the flange connection at the car precludes a tight seal between the boot and the discharge outlet, causing the connection to leak badly at this point.

The primary object of the present invention is to provide a mechanical system for connecting the upper end of the boot or boots to the discharge outlet or outlets on the car by simply raising the boot upward into contact with the frame of the outlet and holding it in sealing engagement therewith. Other objects of the invention are to make the boot connector adaptable for use in existing unloading installations without modification of the pit and to maintain the space under the discharge outlet clear so that boots of any size or style can be used.

Railroad hopper cars are usually provided with discharge outlets on opposite sides of a central load-supporting beam which extends longitudinally of the car. Since the opening for each outlet in such cars is located partially above the track rail on each side of the car, the upper end of each boot must be raised up above the level of the track and then moved laterally outward

2 over the rail so that it is in alignment with the opening to which it is to be connected. It is accordingly another object of the present invention to provide an apparatus which simultaneously raises a pair of boot connectors from a position between the tracks at a railroad car unloading installation, then spreads them apart transversely of the car into alignment with the car discharge outlets and presses them upward into sealing engagement with the outlets, holding them in contact with the car throughout the unloading operation, so that even though the car rises upward as the weight of the load decreases, the boot remains firmly connected with the car outlet. An important object of the invention is to provide a boot connector which automatically tilts transversely of the car in order to compensate for any lean of the car to one side, thereby ensuring a tight seal between the boots and the outlets on the car.

In accordance with one aspect of the invention, bulk-unloading apparatus of the type referred to hereinbefore comprises a flexible coupling tube or boot having its upper end supported on a boot-connecting assembly which is lifted into engagement with the discharge outlet on the car. The boot-connecting assembly is mounted on an elevating mechanism and has a coupling member to which the end of the boot is attached. The coupling member is movable transversely of the direction of lift into alignment with the discharge outlet before engagement is made with it. Power is provided for lifting the boot-connecting assembly and boot up into engagement with the outlet and also for moving the coupling member transversely into alignment with the outlet. Once engagement is made with the outlet, pressure is maintained between the coupling member and outlet in order to maintain a tight seal.

Where two outlets are provided on the car directly above the track rails in a railroad installation, the connecting assembly is provided with two transversely movable coupling members to which two boots are attached so that the upper ends of the boots can be drawn together inwardly in order to fit between the rails when not in use. After the car is in position at the unloading station, the coupling members are raised above the level of the track, moved outwardly toward opposite sides of the car until aligned with the discharge outlets and then lifted up into engagement with the outlets. The connecting assembly is supported by the elevating mechanism such that if the car is tilting with respect to the track, the whole assembly automatically tilts to bring its coupling members into full engagement with the flanges around the discharge outlets as they are raised into contact with the outlets.

In accordance with another aspect of the invention the elevating mechanism for the boot lift includes lifting arms that are pivoted in opposite directions transversely of the track, and preferably with their pivots mounted adjacent the inner sides of the rails, so that their free ends can swing upward from a lowered position, in which they lie flat between the rails, to a raised position above the level of the track. A boot-connecting assembly is supported on the free ends of the lifting arms for engagement with the discharge outlet on the car as the lifting arms swing upward. An extendible power means, such as an air cylinder, is pivotally supported at each end in a generally horizontal position between two short links, each of which is in turn pivoted with respect to one of the oppositely disposed lifting arms, such that upon actuation of the power cylinder in one direction, the links are pivoted downward below the top of the track once the lifting arms reach their lowermost position between the rails of the track. Such downward movement of the short links permits the power cylinder to lower itself between the rails so that it is completely clear of the cars being unloaded as they move into and out of position over the unloading station.

When the boot-connecting assembly is to be raised up into engagement with the discharge outlet on a car, the power cylinder is actuated in the opposite direction, causing the short links to pivot upwardly with respect to the lifting arms before the lifting arms begin to swing up. This raises the power cylinder bodily out from between the rails to a position of mechanical advantage wtih respect to the lifting arms. At this point when each of the short links are disposed about perpendicular to its corresponding lifting arm, the links are prevented from pivoting further with respect to the lifting arms by stops that are rigid with the arms. The force of the power cylinder is then exerted against the stops which pivot the lifting arms so that their free ends swing upward about their pivot mounts and lift the boot-connecting assembly.

It will be apparent that the elevating mechanism of the present invention makes possible a compact power system which can be retracted completely within the limited confines of a railroad track where it will not interfere with parts that hang down below the car and permit very little clearance when the car is moved into position at the unloading station. Furthermore, it does not interfere with parts already located in existing installations. At the same time, by causing the power cylinder to raise itself bodily above the level of the track before exerting any force on the lifting arms, a mechanical leverage for lifting the boot-connecting assembly can be obtained which is difficult if not impossible to obtain otherwise.

These and other advantages will become apparent from the detailed description of one particular embodiment of the invention which is shown in the drawings, wherein.

Figure 1:
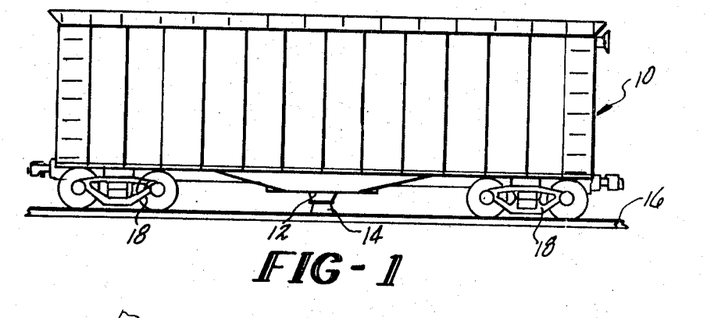
FIG. 1 is a side elevational view of a typical railroad hopper car located at an unloading station in which the bulk-unloading apparatus of the present invention is installed.

FIG. 1 shows a typical railroad hopper car 10 which is unloaded through a pair of discharge outlets 12 in the bottom of the car. Canvas tubes or boots 14, which are here shown connected to the outlets 12, confine the material as it flows from the car into a pit or conveyor housing located below the track 16. Since the hopper discharge outlets 12 extend well below the bottom of the car, it can be readily seen that very little room is available for men to work under the car when the boots have to be clamped by hand to the outlets as has been the usual practice heretofore. Furthermore, due to the relatively small clearance between the outlets 12 and the track 16, as well as between parts of the trucks 18 of the car and the track 16, any unloading equipment which is permanently installed at the unloading station must be capable of being retracted to the level of the track 16 in order to allow the car 10 to pass over it when the car is moved into and out of position at the unloading station.

The unloading apparatus of the present invention is shown positioned between the rails of track 16 and is provided with a boot-connecting assembly 19, which includes a pair of rectangular coupling frames 20, 20' supported for movement transversely of track 16 on an H-shaped frame 21. In this instance two boots 14, 14' are permanently attached at their upper ends to the coupling frames 20, 20'. As will be apparent hereinafter, the boot-connecting assembly 19 is raised by an elevating mechanism into sealing engagement with coupling flanges 22, 22' (FIG. 5) that extend outwardly from and surround the hopper outlets 12, 12' of the car 10 to be unloaded. Each boot-coupling frame 20, 20' has a thick spongy gasket 24, 24' on its upper side that engages the flanges 22, 22' and seals the outlets on the car with the boots 14, 14' when the coupling frames 20, 20' are pressed upward against the discharge outlets of the car.

Figure 8:
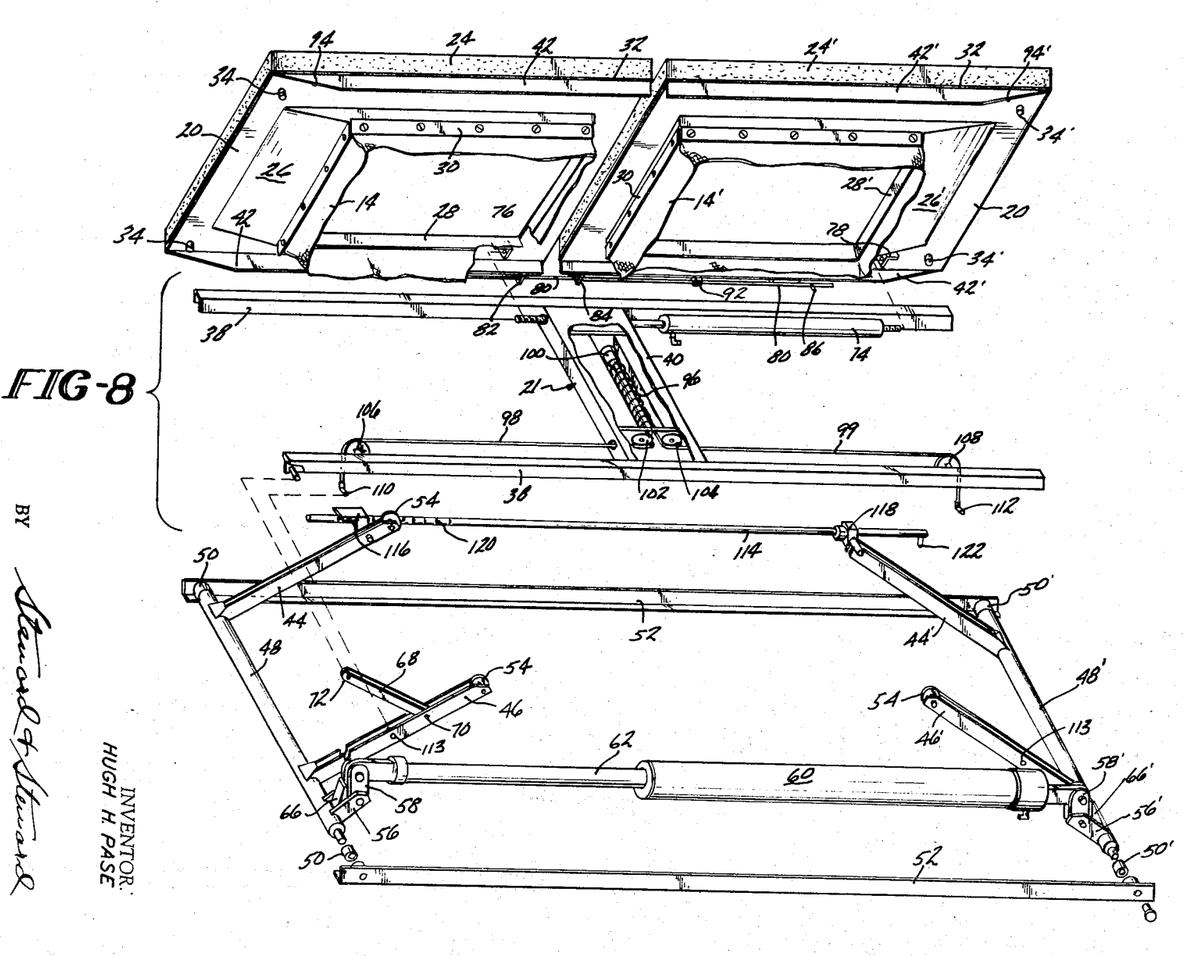
FIG. 8 is an exploded perspective view of the apparatus, looking down on the frame on which the boot-coupling members are supported and with the coupling members tilted back to expose their undersides, the flexible boots being broken away so that the various parts of the assembly are exposed.

As best seen in FIG. 8, boot-coupling frames 20, 20' are provided with funnel-like walls 26, 26', which guide the material inward from the outlets on the car 10 so that it drops completely between the rails 16, 16'. The walls 26, 26' of each frame 20, 20' terminate at a rectangular opening having vertical side walls 28, 28', to which the boots 14, 14' are secured by means of fastening straps 30, 30' that are bolted to the outer sides of walls 28, 28'. In order to make the sponge-rubber gaskets 24, 24' readily removable, they are mounted on stiffening plates or boards 32, 32', which are the same shape as the gaskets themselves. Positioning pegs 34, 34' are provided on the underside of each mounting plate 32, 32', so that when the gaskets are in place, the pegs 34, 34' extend through locating holes therefor in the upper horizontal portions of frames 20, 20'.

Figure 3:
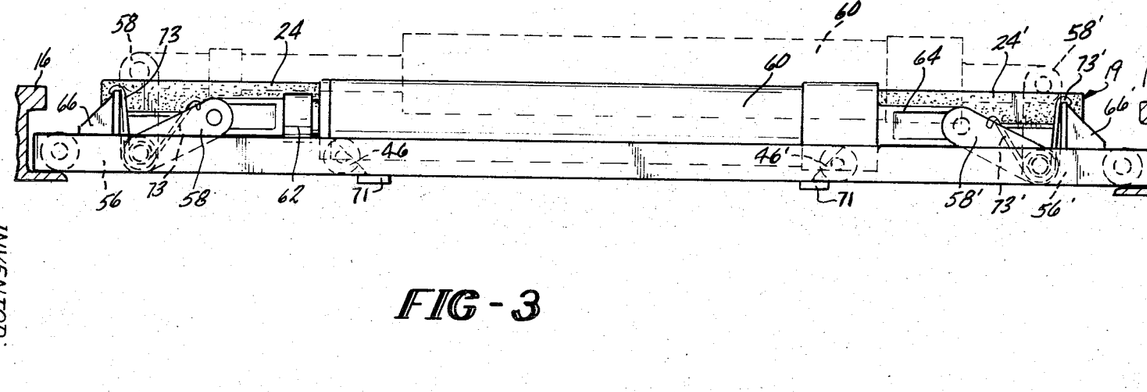
FIGS. 3, 4 and 5 are side elevational views of the unloading apparatus shown in FIG. 2, but looking in the opposite direction along the track and showing the apparatus in positions in which it is fully retracted, partially raised and fully raised and extended, respectively.
Figure 4:
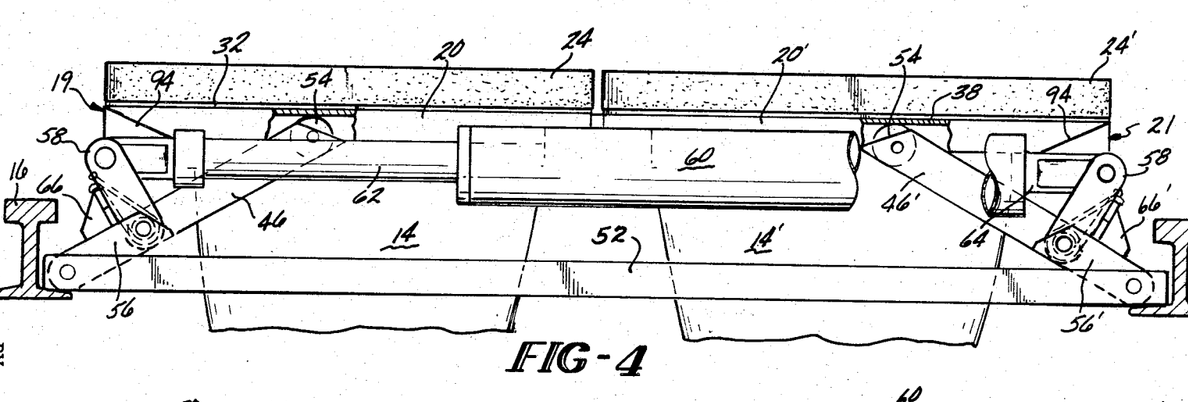
Figure 6:
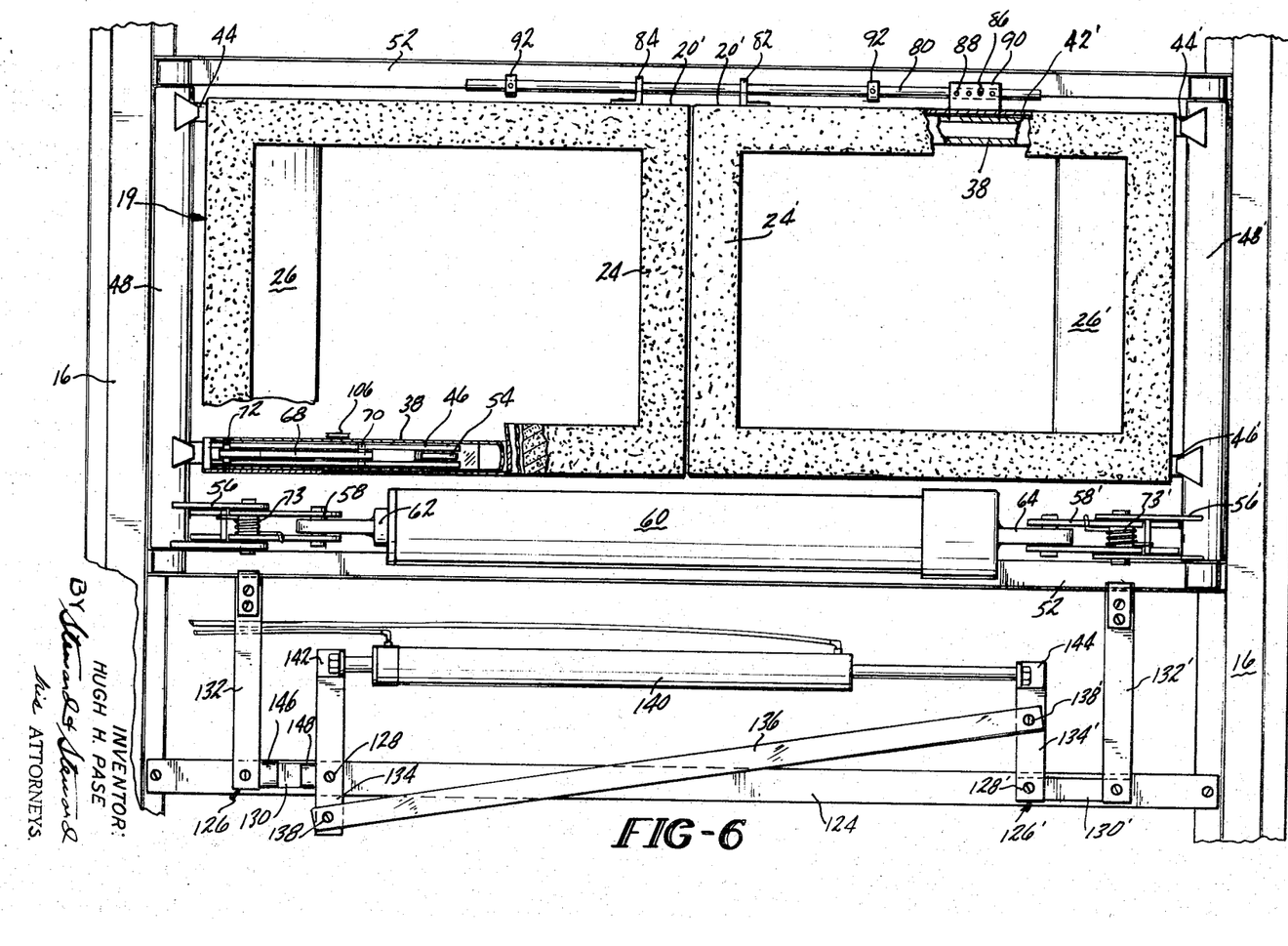
FIG. 6 is a top view of the apparatus in its retracted position as shown in FIG. 3.

The H-frame 21 is constructed of two inverted channel members 38, 38 connected by a broad, central crosspiece 40. As may be seen in FIGS. 3 and 4, the combined width of the boot-coupling frames 20, 20' transversely of the track 16 is less than the distance between the rails of track 16, so that the frames 20, 20' fit between the rails when they are drawn together as shown in FIGS. 3, 4 and 6. The length of the channel members 38, 38 of H-frame 21 is only slightly more than the combined width of boot-coupling frames 20, 20', so that they too fit transversely between the rails. Downwardly extending flanges 42, 42' (best seen in FIG. 8) on opposite sides of the transversely extending edges of boot-coupling frames 20, 20' are spaced from each other such that they span the two channel members 38, 38 on the H-frame and prevent the frames 20, 20' from moving longitudinally of track 16, while permitting them to slide transversely thereof along channels 38, 38.

Figure 5:
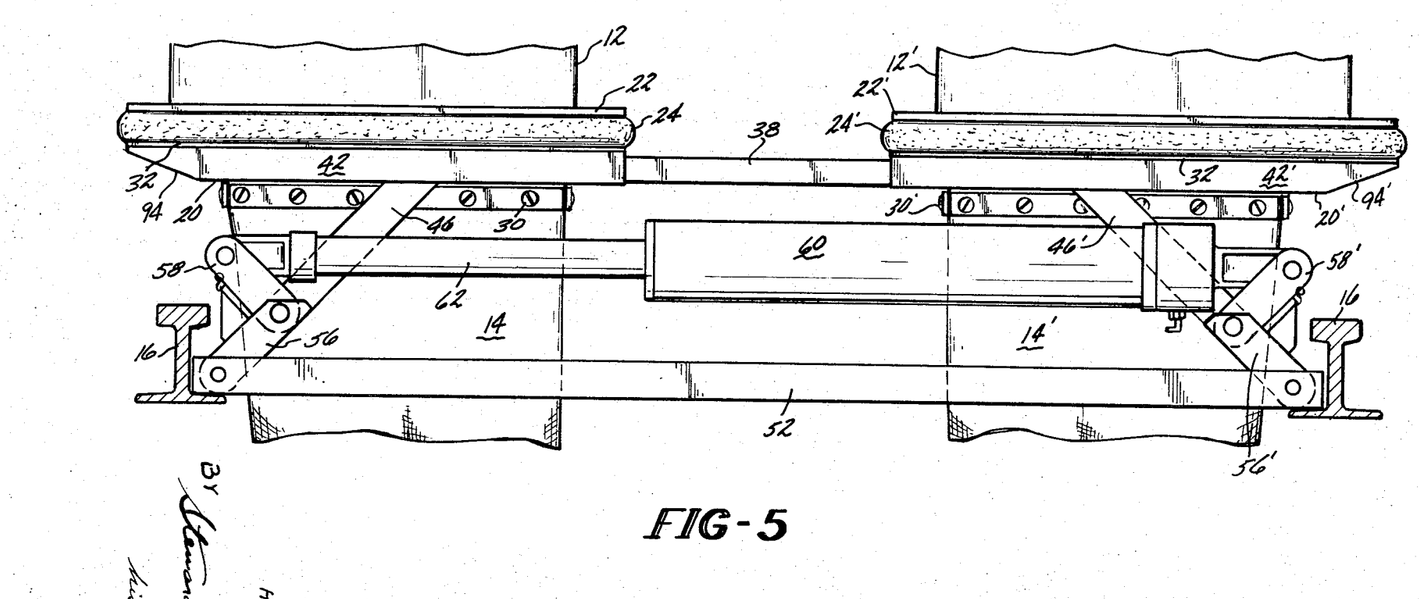

The elevating mechanism for the boot-connecting assembly 19 consists of a pair of lifting arms 44, 46 pivotally mounted adjacent one rail of track 16 and extending inwardly thereof toward a pair of oppositely disposed lifting arms 44', 46' pivoted in the same manner at the other side of the track. Lifting arms 44 and 46 are rigidly secured, as by welding, to a pivot shaft 48 which extends parallel to and just inside of the adjacent rail of track 16. Lifting arms 44' and 46' are similarly secured to a pivot shaft 48' adjacent the opposite rail 16. Pivot shafts 48, 48' are each mounted at both ends for rotation about their longitudinal axes in bearings 50, 50' secured to and supported by a pair of transverse stringers 52, 52, which may desirably be made from lengths of heavy angle iron. As best shown in FIGS. 3–5, stringers 52, 52 are made just long enough so that their ends rest on the top of the base flanges of the rails of track 16. The central web portion of each rail prevents the ends of stringers 52, 52 from slipping off the base flange, while just enough clearance is provided between the ends of the stringers and the rails to permit installation of the unloading apparatus while fully assembled.

Each of the opposing lifting arms 44 and 44' is spaced from the corresponding one of opposing lifting arms 46 and 46' by a distance equal to the distance between the channel members 38, 38 of H-frame 21. Moreover, each of said lifting arms is provided at its free end with a roller 54 that rides within one of the inverted channel members 38, 38 in supporting relation therewith. Crank-arms 56, 56' are rigidly mounted on their respective pivot shafts 48, 48' between the lifting arms 46, 46' and the stringer 52 adjacent thereto. Each of the crank-arms 56, 56' extends parallel to its respective lifting arm 46, 46'. Intermediate short links 58, 58' are each pivotally connected at one end to the outer end of each crank-arm 56, 56', and a pneumatic power cylinder 60 is pivoted between the other ends of links 58, 58' by its piston rod 62 at one end and housing stud 64 at the other end. One of a pair of stops 66, 66' is fixed on each crank arm 56, 56' in position for abutment by links 58, 58' when said links are pivoted with respect to the crank arms from the position shown in full lines in FIG. 3 to the position shown in broken lines, in which they are substantially perpendicular to the crank-arms 56, 56'. Thus, when cylinder 60 is extended by air pressure furnished from an air supply (not shown) causing links 58, 58' to engage their respective stops 66, 66', the crank-arm 56 and link 58 together on one side, and crank arm 56' and link 58' together on the other, each become a crank-lever for rotating its respective pivot shaft 48 or 48' in opposite directions for raising the lifting arms 44, 46 and 44', 46' from their horizontal positions (FIG. 3) to the elevated positions shown in FIGS. 4 or 5. As the free ends of the lifting arms are thus swung upward, the boot-connecting assembly 19 is raised into engagement with the discharge outlets on the car to be unloaded.

It will be noted that as the lifting arms are pivoted upward, their free ends travel outward of each other on rollers 54 along the inside of the inverted channel members 38, 38 of the H-frame 21 of the boot-connecting assembly. In order to maintain the foot-connecting assembly centered on the lifting arms, a centering link 68 (FIG. 8) is pivotally connected at one end 70 to one of the lifting arms 46 and at its other end 72, to the adjacent end of one of the channel members 38, 38. As illustrated in FIG. 6, when the boot-connecting assembly 19 is fully lowered to the position shown in FIG. 3, the centering link 68 nests within the lifting arm 46, which is U-shaped channel capable of receiving the link 68 between its side flanges. Furthermore, each of the four lifting arms 44, 44' and 46, 46' fits within the side flanges of the channels 38 of the H-frame so that both the lifting arms and the H-frame lie substantially within the same plane when the apparatus is fully retracted to the level of track 16.

Figure 7:
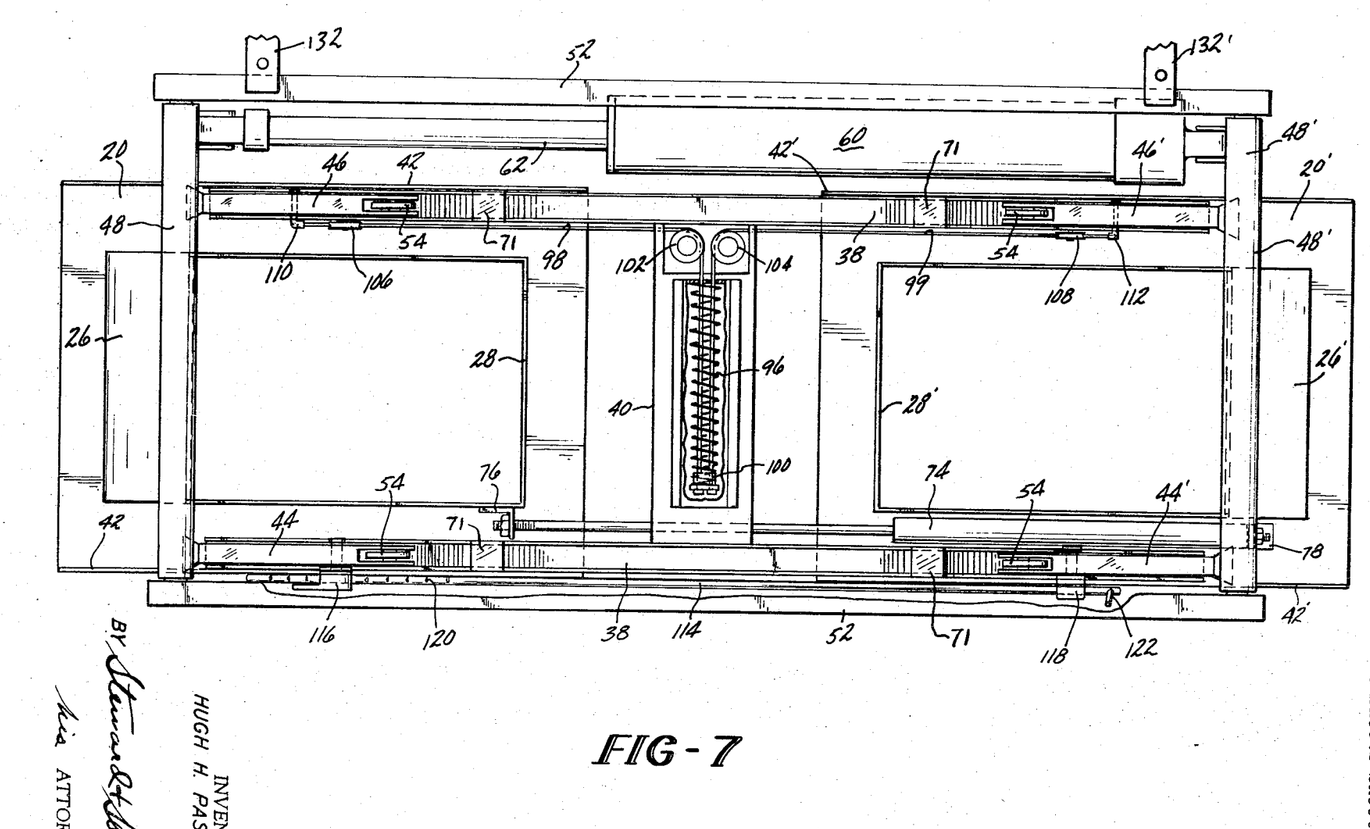
FIG. 7 is a bottom view of the apparatus in its raised position and with the coupling members fully extended as shown in FIG. 5, but with the flexible boots removed.

When the boot-connecting assembly 19 is to be lowered out of engagement with the discharge outlets on the hopper car, the air in cylinder 60 is exhausted to the atmosphere so that the combined weight of the assembly 19, boots 14, 14' and lifting arms 44, 46 and 44', 46' forces the lifting arms down to a horizontal position between the rails of track 16, and within channels 38, 38 with their free ends resting on cross bars 71 (FIGS. 3 and 7) fixed to the lower edges of the side flanges of channels 38, 38. At this point links 58, 58', which are in their broken-line positions shown in FIG. 3, begin to pivot away from their stops 66, 66' under the urge of a pair of torsion springs 73, 73' (FIGS. 3–6). This causes the cylinder 60 to be lowered bodily to its full-line position in FIG. 3, where it is almost completely below the level of the railroad track.

In this lowered position of cylinder 60 with piston rod 62 retracted as far as it will go, links 58, 58' still extend upward at an angle to the crank arms 56, 56', so that when cylinder 60 is again extended, links 58, 58' will pivot back outward against stops 66, 66' raising cylinder 60 to its broken-line position (FIG. 3) where it has a much greater mechanical advantage for lifting the boot-connecting assembly 19 than it has when completely lowered between the rails. The boot-connecting assembly 19, however, remains in its lowered position until the links 58, 58' are pivoted into engagement with stops 66, 66'. Continued extension of cylinder 60 lifts the assembly until its boot-coupling frames 20, 20' clear the top of the tracks (FIG. 4). At this point the coupling frames 20, 20' are spread apart on the H-frame 21 transversely of the track, so that they become vertically aligned with the discharge outlets 12, 12' on the hopper car 10.

Figures 2, 10:
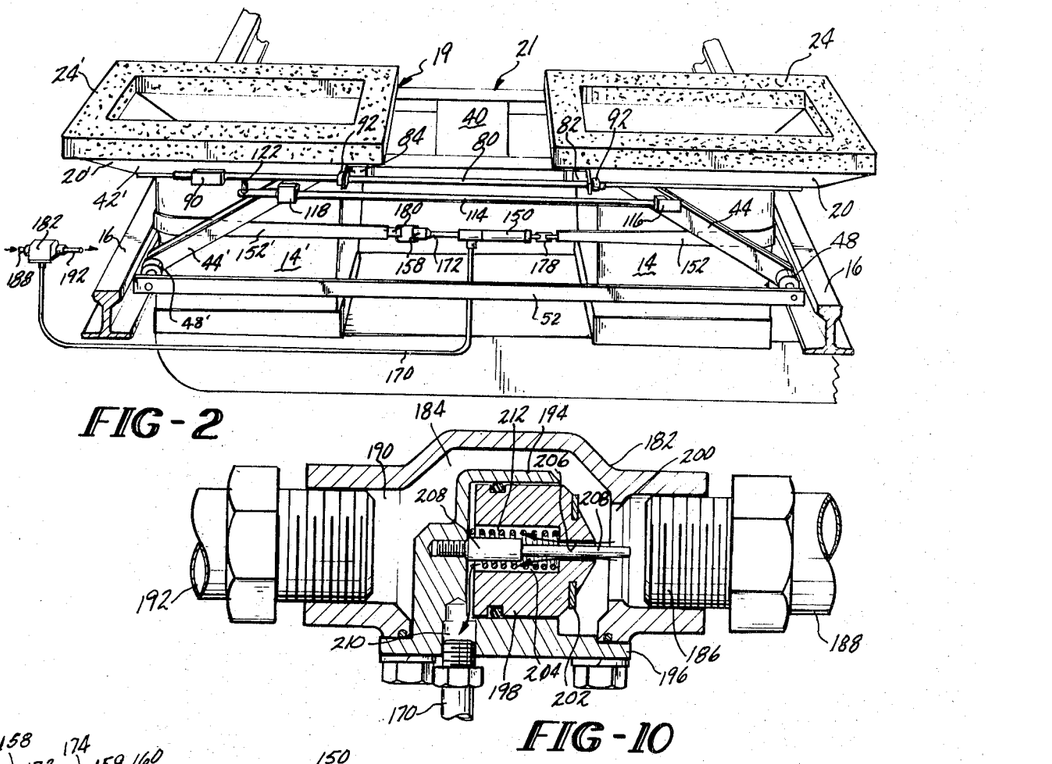
FIG. 2 is a perspective view of the bulk-unloading apparatus of the present invention, looking along the track and without a hopper car in position at the unloading station, the unloading apparatus being shown in extended position as it would be when connected to the outlets on the car.
FIG. 10 is a central longitudinal section through a shut-off valve which is controlled by the pilot valve of FIG. 9.

Coupling frames 20, 20' are moved in this transverse direction by a pneumatic cylinder 74 (FIGS. 7 and 8) which is mounted at one end on a bracket 76 fixed to the underside of the boot-coupling frame 20 and at its other end to a similar bracket 78 rigid with the other coupling frame 20'. It will be noted that the piston rod for cylinder 74 extends freely through holes in the cross-piece 40 of the H-frame 21 for attachment to the coupling frame 20, the cylinder 74 being supported entirely by the coupling frames 20, 20'. In order to position frames 20, 20' for alignment with the discharge outlets on the car, a positioning rod 80, best shown in FIGS. 2 and 6, is slidably supported in brackets 82 and 84 mounted on the outer sides of flanges 42, 42' of the coupling frames 20, 20' on the side opposite the lifting cylinder 60.

Positioning rod 80 is adjustably held in fixed relation to the H-frame 21 by a pin 86, which extends laterally from rod 80 adjacent its free end for engagement in any one of several holes 88 arranged in a row longitudinally of rod 80 on a plate 90 that is rigidly mounted on the adjacent channel 38 of the H-frame. A pair of stop collars 92, 92 are secured for longitudinal adjustment along rod 80 on the outer sides of brackets 82 and 84. Collars 92, 92 are each fixed to rod 80 by suitable means, such as a set screw, at any desired distance apart in order to limit the transverse movement of the boot-coupling frames 20, 20' by engagement of brackets 82 and 84 with collars 92, 92 as the coupling frames are spread outwardly by the transverse cylinder 74. Positioning rod 80 is held loosely in brackets 82, 84 so that its pin 86 can be disengaged from positioning holes 88 and then repositioned in another of said position holes, in order to set the transverse position of both coupling frames in conjunction with the collars 92, 92.

When the coupling frames 20, 20' are disengaged from the discharge outlets on the car by lowering the boot-connecting assembly upon reversing lifting cylinder 60, they are then drawn inwardly again to the position shown in FIG. 4 so that they will again fit down between the rails of track 16. This may be accomplished by spring-loading transverse cylinder 74 toward its contracted position, by providing a suitable return spring between the two coupling frames, or by making cylinder 74 reversible. A suitable air supply, air lines and control valves (not shown) are provided for operating the lifting cylinder 60, which is hydraulically damped in order to ensure smooth operation. Similar control means are provided for actuating the transverse cylinder for spreading the coupling frames apart after they have been lifted above the track and for drawing them together again after they have been lowered out of engagement with the outlets on the car. As will be noted in FIGS. 5 and 8, the lower edge at the outer end of each of the flanges 42, 42' on coupling frames 20, 20' is inclined inwardly at 94, so that if for any reason frames 20, 20' are not drawn completely together by the cylinder 74, the inclined edges 94 will engage the rails of track 16 on both sides and force the frames inwardly between the rails when the boot-connecting assembly is lowered upon reversing lifting cylinder 60.

The lifting mechanism of the present invention is also provided with means for keeping the boot-connecting assembly 19 in a horizontal position as it is being raised, or if the track is tilted at the unloading station, for keeping the assembly 19 parallel with the track as it is raised and lowered into and out of coupling engagement with the outlets. Such leveling means are of considerable importance because the lifting cylinder 60 acts simultaneously and equally on both sets of lifting arms 44, 46 and 44', 46' at opposite sides of the unloading apparatus. Thus, if the lifting arms at one side provide more resistance to being pivoted upward than the other, due for example to there being more weight on one side, the lifting cylinder will raise only the side which exerts the least resistance. In the absence of some means for compensating for such imbalance, one side of the boot-connecting assembly 19 would first be tilted up into engagement with the outlet on one side of the car and then the other side would come up. Such a condition would, of course, be highly undesirable.

The leveling means provided to take care of this condition includes a compensating compression spring 96, housed on the underside of the cross-piece 40 of H-frame 21. A pair of cables 98, 99 are fastened to a plug 100 at one end of spring 96 and pass through the center of the spring, then over a pair of guide pulleys 102, 104, from which they extend in opposite directions to pulleys 106 and 108 mounted at opposite ends of the adjacent channel 38 of the H-frame. From pulleys 106 and 108, cables 98 and 99 extend downward and are fastened by means of elbow bolts 110 and 112, or the like, to opposite corresponding lifting arms 46 and 46', at points 113, each located about one third the distance along each arm from the respective pivot shafts 48, 48'.

It will be apparent that upon upward movement of one side of the boot-connecting assembly 19 ahead of the other side, as for example if the right side (FIG. 8) starts to move upward before the left side, the distance from the pulley 108 to the point at which cable 99 is attached to lifting arm 46' will be greater than the distance from the pulley 106 to the corresponding point on lifting arm 46. This causes cable 99 to compress compensating spring 96, which in turn applies a greater downward force on the right-hand side of the H-frame at the pulley 108. At the same time the tension on cable 98 is reduced due to the fact that cable 99 has taken a greater portion of the load of spring 96. This reduces the force exerted by cable 98 at the left-hand side of the H-frame through pulley 106. The combination of the increased downward force on the right and the decreased downward force on the left immediately results in the lifting arms 44, 46 on the left-hand side as viewed in FIG. 8 exerting less resistance to the force of the lifting cylinder 60 as its piston rod 62 extends outwardly. Consequently, the left side of the boot-connecting assembly promptly moves up until it is level with the right side and remains so as long as the forces on both sides of the lifting mechanism remain in balance.

When the sealing gaskets 24, 24' on coupling frames 20, 20' engage the outlets 12, 12' on the car, the gasket on one side may make contact before the other, due to the fact that the car may be leaning to one side. In that event, the boot-connecting assembly simply tilts into alignment with the outlets on the car, causing one of the cables to take more of the load of compensating spring 96 than the other. This condition will maintain so long as the car continues to lean with respect to the track. In any event the boot-connecting assembly, including coupling frames 20, 20' automatically tilt into alignment with the outlets as the lifting cylinder 60 urges the gasket 24, 24' upward into sealing engagement with the flanges 22, 22'. Upward pressure between gaskets 24, 24' and flanges 22, 22' is maintained by cylinder 60 during the entire time that the car is unloading. Furthermore, as the car raises upward on its suspension with the decrease in load, the boot-connector moves up with the car under the continued pressure of the lifting cylinder.

As a safety measure against temporary interruption of air pressure to the lifting cylinder, which would permit the boot-connecting assembly to drop out of sealing engagement with the discharge outlets on the car, a locking system is provided that permits the lifting mechanism to raise the assembly while mechanically latching it against lowering. To this end, a locking bar 114 (FIGS. 2, 7 and 8) is connected between the lifting arms 44, 44' near their free ends. One end of locking bar 114 extends through a ratchet block 116 which is pivotally mounted on the lifting arm 44, while the other end of locking bar 114 is held in a bearing block 118 pivotally mounted on lifting arm 44'. Bar 114 is supported in blocks 116, 118 for rotation about its longitudinal axis. Suitable means, such as retaining rings on opposite sides of bearing block 118, are provided on locking bar 114 in order to prevent it from moving longitudinally of the block 118 on lifting arm 44'. The other end of locking bar 114 is provided with ratchet teeth 120 along one side only of the section that extends through ratchet block 116.

When the bar 114 is turned so that teeth 120 are engaged by a pawl (not shown) in rachet block 116, the locking bar 114 can move longitudinally through block 116 in one direction—to the right as viewed in FIG. 8— which permits the lifting arms 44, 44' to swing upward. In this position, however, locking bar 114 is prevented from moving through ratchet block 116 in the other direction, thereby locking the lifting arms in their raised positions. In order to release the lifting arms so that they can return to their lowered positions, locking bar 114 is simply turned 90° about its longitudinal axis so that the teeth 120 no longer engage the pawl in the ratchet block. The locking bar assembly here employed will be recognized as similar to the familiar hand-brake, actuating assembly used in many automobiles.

In starting to connect the unloading apparatus to the car, the locking bar 114 is rotated by means of a handle 122 into locking position. If after the connection is made and the product starts to flow, air pressure to lifting cylinder 60 is discontinued, locking bar 114 prevents the boot-connector from becoming disconnected. On the other hand, in order to disconnect the unloader when the car is unloaded, it is only necessary to release the safety lock by rotating bar 114 so that the boot-connecting assembly can drop down when cylinder 60 is vented.

As illustrated in FIG. 6, an aligning attachment may be provided for adjusting the boot-lifting apparatus as a unit along the track in case the car is not spotted exactly in position for engagement of the boot-connecting assembly with the discharge outlets. Thus, at one side of the apparatus a bar 124 is clamped rigidly at both ends to the rails of track 16, and a pair of bell-cranks 126, 126' are pivoted at 128, 128' on bar 124 in spaced relation to each other. To one arm 130 of bell-crank 126 is pivoted a push-rod 132, that is clamped to the adjacent stringer 52 of the boot-connecting apparatus. The corresponding arm 130' of bell-crank 126' has pivoted thereto a second push-rod 132' which is clamped to the same stringer 52 near its other end. Arms 134, 134' of bell-cranks 126, 126' extend in opposite directions across bar 124 and are connected by a tie-rod 136, which is pivoted to the arm 134 at 138 and to the arm 134' at 138'. The arm 134 also extends in the same direction as arm 134' beyond the pivot point 128, and a double-acting pneumatic cylinder 140 is mounted at one end to the outer end 142 of the extension of arm 134 and at its other end to the end 144 of the arm 134' of bell-crank 126'. If it is desired to shift the boot-attaching apparatus a few inches in either direction along track 16, cylinder 140 is actuating in one direction or the other in order to rotate bell-cranks 126, 126' simultaneously in opposite directions to each other, causing push rods 132, 132' to slide the apparatus the desired distance along the track until the assembly is aligned with the discharge outlets on the car. On the other hand, the aligning apparatus can be operated manually by inserting a long bar (not shown) through a pair of brackets 146, 148 spaced along the arm 130 and by rotating the bell-cranks with the bar instead of by means of cylinder 140.

A further attachment for the boot-connecting apparatus of the present invention includes a monitoring device for controlling a pneumatic vibrator, which vibrates the hopper on the car in order to make the material in the car flow through the discharge outlets if it clogs during unloading. It is standard practice to attach a pneumatic vibrator to the hopper while the car is being unloaded, both to start the flow of material when the hopper doors are first opened and to restart the flow when the material clogs in the opening while the car is only partially unloaded, as well as to shake all the material from the walls of the car when it is almost completely empty. Heretofore these vibrators have been turned on by an operator when needed. This requires constant supervision by the operator in order to ensure that the material does not stop flowing before the car is empty.

The only way the operator can tell that the flow has stopped before the car is empty without climbing up the sides of the car and looking inside, is to observe the condition of the flexible boots 14. When the product is flowing properly the boots are full and balloon out, but when the product clogs in the hopper before entering the boots, the boots collapse inwardly like a deflated balloon. It has been necessary heretofore for the operators to check the condition of the boots frequently during unloading of a car to be sure that the car is unloading continuously. If the flow has stopped, the operator turns on the vibrator to restart it. Sometimes the fact that a car is no unloading goes unnoticed for quite some time, which means that the unloading time is extended by the length of time that the flow was interrupted. Furthermore, the operator must stay at the same car more or less continuously just to be sure the flow continues, whereas he could better spend his time connecting or disconnecting other cars that are being unloaded.

Figure 9:
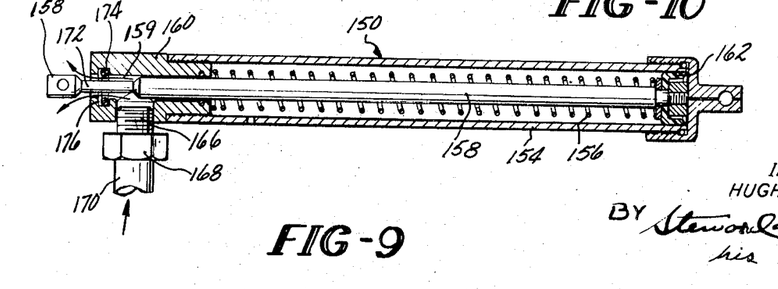
FIG. 9 is a central longitudinal section through a pilot valve for monitoring a pneumatic vibrator employed in conjunction with the unloading apparatus of the present invention.

The monitoring system used in connection with the present apparatus for operating the vibrator is shown in FIGS. 2, 9 and 10. It includes a flow-no-flow sensor consisting of a spring-loaded pilot valve 150 which is suspended by straps 152, 152' between the two boots 14, 14'. Straps 152, 152' may be suitably stitched to the outer surface of the boots so that they are about level with the track 16 when the boot-connecting assembly is fully raised into engagement with the discharge outlets.

As shown in FIG. 9 pilot valve 150 is provided with an elongated housing 154 for a compression spring 156. A combined valve stem and piston rod 158 extends through an air passage 159 in a valve body 160 at one end of housing 154 and through the center of spring 156, which has one end engaging the inner end of valve body 160 and the other end engaging the back of a plunger 162 fixed to the inner end of the valve stem 158. Air passage 159 extends axially from the outer end of valve body 160 to a lateral inlet passage 166, into which is threaded a fitting 168 for an air hose 170. Valve stem 158 has a short section 172 adjacent its outer end which is reduced in diameter, such that when it is fully retracted into the housing 154 as shown in FIG. 9, air is permitted to escape from the passage 159 through the end of the valve body 160 around the section 172 of the valve stem. However, when valve stem 158 is drawn outward against compression spring 156, the reduced section 172 is withdrawn from the valve body 160 so that the portion of valve stem 158 inwardly of section 172 fills the outlet end of passage 159 and prevents the further escape of air through the pilot valve. An O-ring 174 is provided in an annular groove 176 surrounding the outlet end of passage 159 for sealing engagement with valve stem 158 when it is withdrawn outwardly.

The housing 154 of pilot valve 150 is fastened to the strap 152 on boot 14 by a ring 178, and the valve stem 158 is similarly secured by a ring 180 to the strap 152' on the other boot, such that when the boots are collapsed there is no pull on the valve stem 158. However, when the product fills the boots as it flows from the car, the valve stem 158 is withdrawn outwardly, as shown in FIG. 2, preventing the escape of air through valve 150. The air hose 170 is connected to a shut-off valve 182, through which air flows to the vibrator (not shown). Shut-off valve 182 (FIG. 10) has a cylindrical chamber 184 with an inlet 186 for an air hose 188 connected to an air pressure supply (not shown) and an outlet 190 for another hose 192 that is connected to the vibrator. Located centrally within the chamber 184 is a hollow cylinder 194 that is mounted on, and extends inwardly from, a wall plate 196 in one side of the housing of valve 182. A cylindrical valve member 198 fits like a piston within the open end of cylinder 194 for movement longitudinally of the valve chamber 184 into and out of engagement with a valve seat 200 at the inner end of inlet 186. A neoprene washer 202 is provided on the face of the valve member 198 for sealing engagement with the seat 200.

Valve member 198 is provided with a central chamber 204 and passage 206, through which extends a guide rod 208 that is rigidly mounted in the closed end of cylinder 194. The free end of guide rod 208 is of a diameter small enough to permit the flow of air to the opposite side of valve member 198 within cylinder 194. A pilot passage 210 extends transversely through side plate 196 to the inner end of cylinder 194 for the flow of air from behind valve member 198 to the air hose 170 which is connected to pilot valve 150. A coil spring 212 surrounding guide rod 208 is compressed between the bottom of cylinder 194 and the annular shoulder between the passages 204 and 206 in valve member 198. Spring 212 urges valve member 198 toward its closed position for cutting off the flow of air to the vibrator but is not strong enough by itself to prevent such flow. However, when the flow of air through pilot passage 210 is cut off by pilot valve 150 when the boots 14, 14' fill out as the material is unloaded, air pressure builds up behind valve member 198 due to the continued flow of air through its passages 204 and 206 from the air supply at the inlet 186 of valve 182. The pressure behind the valve member 198 supplemented by the force of spring 212 is enough to move the valve member 198 into closing relation with the valve seat 200, shutting off the air to the vibrator so that it does not operate so long as the boots on the unloader are full.

It will be noted that the area behind the valve member 198 is greater than the area within the valve seat 200. Consequently, once the valve is closed it is positively held in this position, so long as pressure is maintained behind the valve member. However, when the flow of material from the car stops, the boots empty, causing them to collapse and to release the pull on the valve stem 158 of pilot valve 150, which then vents the air in the pilot line 170 to shutoff valve 182 and in the cylinder 194 behind the valve member 198 of shut-off valve 182. This causes the valve member 198 to open under the pressure of the air in the supply line 188 so that air again flows to the vibrator which operates to vibrate the hopper on the car being unloaded until the material starts to flow again and closes pilot valve 150, causing shut-off valve 182 to close. The vibrator is accordingly automatically monitored during the entire unloading of the car, so that the flow of material is practically continuous and the car unloaded in a minimum amount of time without any attendance by the operator at the unloading station.

What is claimed is:

1. In bulk-unloading apparatus including a flexible tubular boot permanently attached at its lower end to a receptacle in a roadbed and connectable at its upper end to the discharge outlet of a bulk car, a boot-lifter permanently mountable in the roadbed above said receptacle for elevating the upper end of said boot into coupling engagement with the outlet of the car, said boot-lifter comprising in combination a boot-connecting assembly, and elevating mechanism including elevating power means for raising said boot-connecting assembly from a lowered position adjacent the surface of said roadbed into engagement with said discharge outlet and for continuously urging it into engagement therewith while said bulk car is being unloaded, said boot-connecting assembly having a supporting frame and a coupling member carried by said supporting frame thereon laterally of the elevating movement of said boot-connecting assembly, means for securing the boot at its upper end to said coupling member, and means for moving said coupling member transversely into alignment with said discharge outlet prior to engagement of said boot-connecting assembly therewith.

2. The combination defined in claim 1 for installation at an unloading station in a railroad track for unloading flowable solid material from a railroad hopper car having a pair of discharge outlets disposed transversely of the track and extending outwardly over the rails on each side of said track, which further includes a second flexible tubular boot and a second coupling member to which said second boot is secured, both said coupling members being disposed transversely of said track and supported for movement by said transverse power means from a retracted position wholly within the confines of said rails to an extended position in which at least a portion of each of said coupling members is located directly above the rail on each side of the car for alignment with one of said discharge outlets on the car.

3. Apparatus as defined in claim 2, which further includes control means for actuating said elevating power means prior to actuation of said transverse power means when said coupling members are in their retracted and lowered positions, such that said coupling members are raised above said track while in their retracted position before being spread outwardly into alignment with said discharge outlets over the track rails.

4. Apparatus as defined in claim 1 for installation at an unloading station in a railroad track, wherein said elevating mechanism further includes a pair of elongated frame members disposed in spaced parallel relationship to each other, said frame members being of such length that their opposite ends bear on the base flanges of the track rails when said boot-lifter is mounted in the roadbed with said frame members disposed transversely of the rails, such that said boot-lifter is supported entirely by the track rails.

5. Apparatus as defined in claim 4, which further includes an aligning attachment for moving said boot-lifter bodily along the tracks in case the car to be unloaded is not spotted on the track so that its discharge outlet is exactly aligned with the coupling member, said aligning attachment having force-multiplying means fastened rigidly to the track and to at least one of said frame members for sliding said frame members along the track, and means for actuating said force-multiplying means.

6. Apparatus for elevating a coupling for a bulk-unloading facility at an unloading station in a railroad track which comprises in combination, a boot-connecting assembly, oppositely disposed lifting arms each pivotally mounted at one end between the rails of said track and extending transversely of said track in opposite directions, each of said lifting arms having a free end on which said boot-connecting assembly is supported, each said lifting arm being pivotable from a lowered position in which it is substantially parallel with the plane of said track and disposed substantially within the confines of said rails to a raised position in which its free end extends above said track for elevating said boot-connecting assembly, a link pivotally mounted with respect to one of said lifting arms and a second link pivotally mounted with respect to said oppositely disposed lifting arm, each of said links being pivotable from a retracted position, in which it extends upwardly at an angle to its corresponding lifting arm when said lifting arm is in its lowered position, to an elevating position, in which it extends upward at a greater angle to its corresponding lifting arm in said lowered position, said links extending in opposite directions to each other when in their retracted positions, a stop-member rigid with each of said lifting arms and disposed for engagement by the corresponding one of said links upon pivotal movement of said links to their said elevating positions, and a power cylinder pivotally connected at its opposite ends to said links such that when said links are disposed in their said retracted positions said power cylinder lies substantially level with said track and when said power cylinder is actuated with said links in their retracted positions said links are pivoted with respect to said lifting arms into their elevating positions in engagement with said stop-members, thereby causing said power cylinder to raise itself bodily and, upon further actuation of said power cylinder after engagement of said links with said stop-members, to pivot said lifting arms upward from their said lowered positions to said raised positions.

7. Apparatus as defined in claim 6 wherein each of said lifting arms is pivotally mounted adjacent the inner side of a rail of the track and pivots toward the other and said links extend inwardly toward each other when in their retracted positions such that extension of said power cylinder causes it to raise itself and then to pivot said lifting arms upward.

8. Apparatus as defined in claim 7 which includes a pair of pivot shafts, extending longitudinally of the track, each said pivot shaft being supported adjacent the inner side of a rail of said track for pivotal movement about its longitudinal axis and having two of said lifting arms rigidly mounted thereon for pivotal movement in unison therewith, the lifting arms on each pivot shaft being parallel to and spaced from each other by a distance equal to the distance between the said lifting arms on the other pivot shaft, said boot-connecting assembly including a pair of parallel inverted channel members disposed generally horizontally and transversely of the track and spaced from each other by the same amount that said lifting arms on each pivot shaft are spaced such that the free ends of two of said oppositely disposed lifting arms are received within and ride along the under side of each of said inverted channel members.

9. Apparatus as defined in claims 4, 6, or 8, which includes a centering link pivotally connected adjacent one end to one of said lifting arms and adjacent its other end to said boot-connecting assembly.

10. Apparatus as defined in claim 8, which further includes a centering link pivotally connected adjacent one end of one of said lifting arms and adjacent its other end to the adjacent one of said channel members, said one lifting arm, centering link and adjacent channel member being adapted and arranged to nest substantially one within the other when said lifting arms are disposed in their lowered positions.

11. Apparatus as defined in claims 6, 7, 8 or 10, which further includes a leveling device comprising a spring mounted on said boot-connecting assembly and a pair of cables each connected at one end to the same point on said spring, said cables extending parallel to each other a predetermined distance from the point at which they are connected to said spring, said cables then extending in different directions to positions on said boot-connecting assembly, transversely of said track, which are equidistant from the transverse center-line of said boot-connecting assembly, and guide-means on said boot-connecting assembly over which said cables are trained for directing said cables to said positions, the opposite end of each of said cables being connected at a point external to and below said boot-connecting assembly such that any tilting of said boot-connecting assembly as it is being raised results in uneven movement of said cables over said guide-means so that one of said cables takes more of the force of said spring than the other.

12. Apparatus as defined in claims 8 or 10 wherein said boot-connecting assembly further includes a pair of coupling members supported on said channel members transversely of said track for movement along said channel members, and a second power cylinder for moving said coupling members toward and away from each other along said channel members.

References Cited

UNITED STATES PATENTS 2,813,640  11/1957  Loomis _________ 214—44 XR

ROBERT G. SHERIDAN, Primary Examiner

U.S. Cl. X.R.

214—64.2; 222—56